United States Patent
Sullivan et al.

(10) Patent No.: US 8,367,964 B2
(45) Date of Patent: Feb. 5, 2013

(54) REPAIR METHODS INVOLVING CONDUCTIVE HEAT RESISTANCE WELDING

(75) Inventors: Nicole Sullivan, Manchester, CT (US); John H. Hughes, Neddick, ME (US); James J. Moor, New Hartford, CT (US); David A. Rutz, Glastonbury, CT (US); Sudhangshu Bose, Manchester, CT (US)

(73) Assignee: United Technologies Corp., Hartford, CT (US)

( * ) Notice: Subject to any disclaimer, the term of this patent is extended or adjusted under 35 U.S.C. 154(b) by 1200 days.

(21) Appl. No.: 12/186,602

(22) Filed: Aug. 6, 2008

(65) Prior Publication Data

US 2010/0032415 A1 Feb. 11, 2010

(51) Int. Cl.
B23K 11/00 (2006.01)
B23K 31/02 (2006.01)

(52) U.S. Cl. ............... 219/117.1; 228/119; 29/889.1

(58) Field of Classification Search .............. None
See application file for complete search history.

(56) References Cited

U.S. PATENT DOCUMENTS

| | | | |
|---|---|---|---|
| 4,726,104 A | 2/1988 | Foster et al. | |
| 6,077,615 A * | 6/2000 | Yada et al. | 428/544 |
| 6,219,916 B1 | 4/2001 | Walker et al. | |
| 6,281,467 B1 | 8/2001 | Gould et al. | |
| RE37,562 E * | 2/2002 | Clark et al. | 416/241 R |
| 6,545,244 B1 | 4/2003 | Gould et al. | |
| 6,742,698 B2 | 6/2004 | Shah et al. | |
| 7,126,076 B2 | 10/2006 | Workman et al. | |
| 7,126,079 B2 | 10/2006 | Trewiler et al. | |
| 7,141,754 B2 | 11/2006 | Workman et al. | |
| 7,244,320 B2 | 7/2007 | Malley et al. | |
| 2006/0117562 A1 * | 6/2006 | Subramanian et al. | 29/889.1 |
| 2007/0084906 A1 | 4/2007 | Vargas et al. | |
| 2007/0157447 A1 * | 7/2007 | Prevey | 29/402.01 |
| 2008/0267775 A1 * | 10/2008 | Grady et al. | 415/208.1 |
| 2009/0123290 A1 * | 5/2009 | Imano et al. | 416/241 R |
| 2011/0005075 A1 * | 1/2011 | Trewiler et al. | 29/889.1 |

FOREIGN PATENT DOCUMENTS

| | | |
|---|---|---|
| EP | 1092497 | 4/2001 |
| WO | 2008/046542 | 4/2008 |

OTHER PUBLICATIONS

EP Search Report dated Nov. 11, 2012.

* cited by examiner

*Primary Examiner* — Kiley Stoner
(74) *Attorney, Agent, or Firm* — Carlson, Gaskey & Olds PC

(57) ABSTRACT

Repair methods involving conductive heat resistance welding includes repairing a crack of a gas turbine engine component using a conductive heat resistance welding technique and a welding technique other than conductive heat resistance welding.

16 Claims, 2 Drawing Sheets

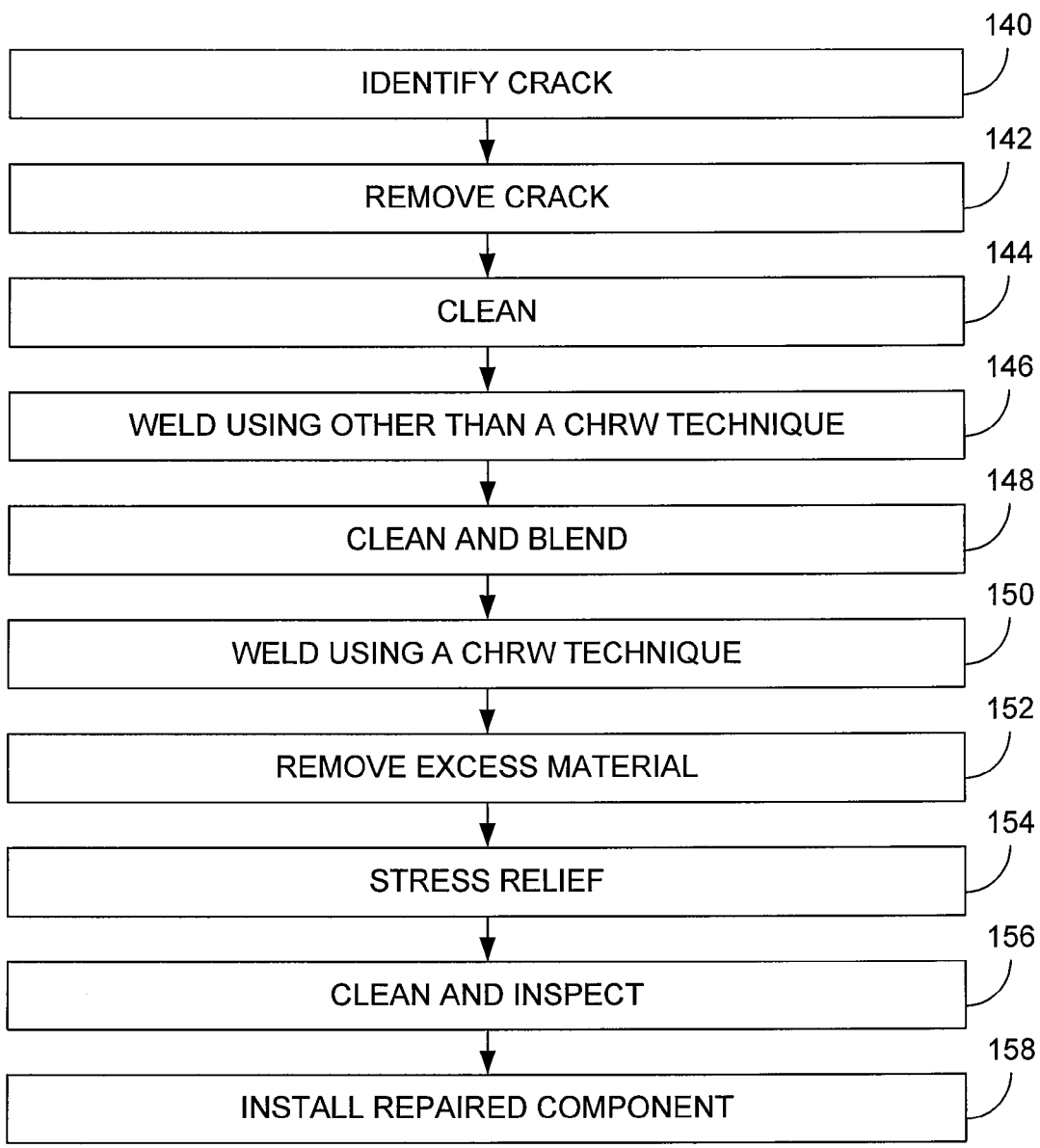

REPAIR METHODS INVOLVING CONDUCTIVE HEAT RESISTANCE WELDING

BACKGROUND

1. Technical Field

The disclosure generally relates to repair of gas turbine engine components.

2. Description of the Related Art

As is known, various components of a gas turbine engine can degrade over time. By way of example, components that are used to direct the flow of gas through the gas turbine engine can become abraded. Additionally, components can crack due to thermal cycle fatigue or oxidation, for example. Such degraded components typically are repaired by application of plasma spray, weld repair or plating. However, it is oftentimes difficult to repair such components because the cracks can extend along both planar and non-planar surfaces of the components.

SUMMARY

Repair methods involving conductive heat resistance welding are provided. In this regard, an exemplary embodiment of a repair method comprises: identifying a crack on a gas turbine engine component, the crack having a first portion extending along a first surface and a second portion extending along a second surface, the first surface and the second surface being non-planar with respect to each other; welding the first portion of the crack using welding other than conductive heat resistance welding; and welding the second portion of the crack using conductive heat resistance welding.

Another exemplary embodiment of a repair method comprises repairing a crack of a gas turbine engine component using a conductive heat resistance welding technique and a welding technique other than conductive heat resistance welding.

Another exemplary embodiment of a repair method involving conductive heat resistance welding comprises: identifying a crack on a gas turbine engine component, the crack having a first portion extending along a first surface and a second portion extending along a second surface, the first surface and the second surface being non-planar with respect to each other; welding the first portion of the crack using a non-parent metal of the component and a welding process other than conductive heat resistance welding; and welding the second portion of the crack using a parent metal of the component and conductive heat resistance welding.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 3 is a flowchart depicting an exemplary embodiment of a repair method involving conductive heat resistance welding.

FIG. 4 is a flowchart depicting another exemplary embodiment of a repair method involving conductive heat resistance welding.

DETAILED DESCRIPTION

Repair methods involving conductive heat resistance welding are provided, several exemplary embodiments of which will be described in detail. In some embodiments, repairs are made to gas turbine engine components that exhibit cracks, some of which extend along complex surfaces of the components. By way of example, such a crack can extend along a curved surface, which is not typically considered well suited for conductive heat resistance welding. As another example, a crack can extend from a planar surface to a non-planar surface. For such a crack, repair may be undertaken by using a welding technique other than conductive heat resistance welding of the portion of the crack of the non-planar surface, while using conductive heat resistance welding for the other portion of the crack.

Figure 1:
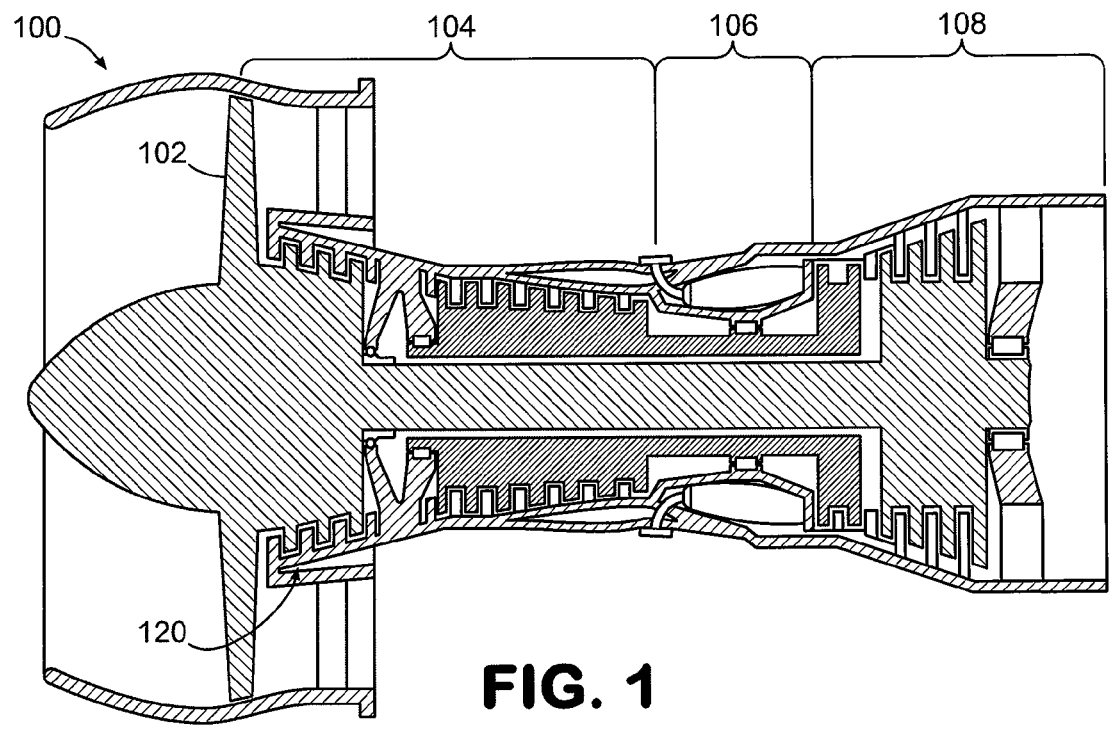
FIG. 1 is a schematic diagram depicting an exemplary embodiment of a gas turbine engine.

In this regard, reference is made to the schematic diagram of FIG. 1, which depicts an exemplary embodiment of a gas turbine engine. As shown in FIG. 1, engine 100 is depicted as a turbofan that incorporates a fan 102, a compressor section 104, a combustion section 106 and a turbine section 108. Although depicted as a turbofan gas turbine engine, it should be understood that the concepts described herein are not limited to use with turbofans as the teachings may be applied to other types of engines.

Also shown in FIG. 1 is a component 120 (in this case, a compressor stator flange located within the compressor section 104) that is in need of repair. Various components other than a compressor stator may be suited for repair by an embodiment of a repair method. By way of non-limiting example, fan cases, compressor cases and turbine cases also can be repaired. Notably, these components share the characteristic of including attachment holes in corresponding flanges that can be subject to wear and fatigue cracking. In this example, the component 120 is fabricated from aluminum, although repair methods are not limited to use with aluminum components. For instance, components formed of nickel and/or titanium also can be repaired using a repair method, such an exemplary method described herein.

Figure 2:
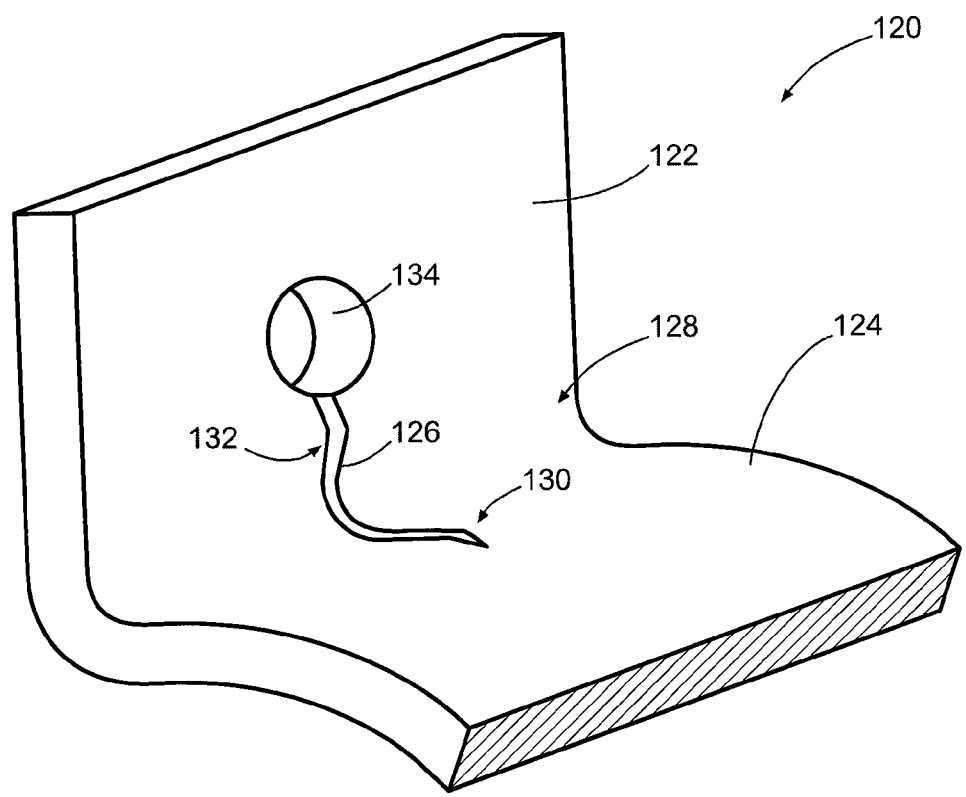
FIG. 2 is a schematic diagram depicting a portion of a representative degraded component from the engine of FIG. 1.

FIG. 2 is a schematic diagram depicting a portion of a representative degraded component from the engine of FIG. 1. As shown in FIG. 2, component 120 includes surfaces 122 and 124, with a crack 126 extending along both of the surfaces. In this embodiment, surfaces 122 and 124 do not reside in the same plane. Additionally, surface 122 is a planar surface and surface 124 is a non-planar surface, with a fillet region 128 being located between surfaces 122, 124. Thus, a first portion 132 of the crack 126 originates in bolt hole 134 and extends along the planar surface 122 into fillet region 128, after which a second portion 130 of the crack 126 extends along the non-planar surface 124. Notably, in this embodiment, crack 126 terminates in the non-planar surface of the component.

Repair of component 120 can be undertaken by various methods, such as the exemplary repair method depicted in FIG. 3. As shown in FIG. 3, repairing a crack of a gas turbine engine component can be accomplished using a conductive heat resistance welding (CHRW) technique and a welding technique other than conductive heat resistance welding (block 138). Notably, representative conductive heat resistance welding techniques are described in U.S. Pat. Nos. 6,281,467, 6,545,244, 7,126,076 and 7,141,754, for example, each of which is incorporated herein by reference. Additionally, representative welding techniques other than conductive heat resistance welding include, but are not limited to, arc welding processes such as gas tungsten arc (GTA), metal inert gas (GMA) and plasma arc welding (PAW).

FIG. 4 is a flowchart depicting another exemplary embodiment of a repair method involving conductive heat resistance welding (CHRW). As shown in FIG. 4, the method may be construed as beginning at block 140, in which a crack is identified on a gas turbine engine component. In some embodiments, this may involve identifying the crack while the component is still installed in the engine, while in others, the component is first removed. In block 142, the crack is removed such as by using a router to route out material surrounding the crack. In block 144, the component is optionally cleaned. Then, as depicted in block 146, a first portion of the crack is welded using a welding technique other than conductive heat resistance welding. In some embodiments, such welding can be performed using a non-air environment about at least the first portion of the crack. Notably, the first portion of the crack may extend along a portion of the component surface that is non-planar, in some embodiments. In block 148, the component is optionally cleaned and the weld location is blended to remove excess material.

In block 150, a second portion of the crack is welded using conductive heat resistance welding. In particular, in some embodiments, such welding involves positioning a metal plug within the second portion of the crack, positioning a conductive plate adjacent to the second portion of the crack and the metal plug, and using the plate to melt the metal plug. Melting of the metal plug with the plate is accomplished by heating the plate via an electrical current. Notably, in some embodiments, care can be taken to reduce the opportunity for weld flash (i.e., liquid weld material produced by the metal plug) from seeping out of the weld location.

In block 152, any excess weld material can be removed from the component so that the component is finished to desired dimensions. Then, as depicted in block 154, stress relief can be performed in order to reduce the internal stresses of the component in a vicinity of the weld location. By way of example, if the component is formed of AA6061 aluminum (a common gas turbine component material), stress relief can be performed at approximately 325° F. for approximately 4 hours. In block 156, the component can be optionally cleaned and inspected to ensure adequate repair. In block 158, the component can be installed in a gas turbine engine, such as the engine from which the component was removed.

Conventionally, AA6061 aluminum is typically welded with non-parent metal filler alloy in order to reduce weld defects. Notably, conductive heat resistance welding utilizes a plug of parent metal composition. Therefore, using a method such as the exemplary method of FIG. 4, for example, a weld can be formed using parent metal, while alternative welding processes may be employed in lower stress regions that because of geometry do not lend themselves to a conductive heat resistance welding process.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A repair method involving conductive heat resistance welding comprising:
   identifying a crack on a gas turbine engine component, the crack having a first portion extending along a first surface and a second portion extending along a second surface, the first surface and the second surface being non-planar with respect to each other;
   welding the first portion of the crack using welding other than conductive heat resistance welding; and
   welding the second portion of the crack using conductive heat resistance welding.

2. The method of claim 1, wherein welding the second portion of the crack using conductive heat resistance welding comprises:
   positioning a metal plug within the second portion of the crack;
   positioning a conductive plate adjacent to the second portion of the crack and the metal plug;
   applying pressure to the metal plug; and
   using the plate to melt the metal plug.

3. The method of claim 1, wherein the second surface is a planar surface.

4. The method of claim 1, wherein the first surface is a non-planar surface.

5. The method of claim 1, wherein welding the second portion of the crack comprises restricting weld flash produced during the conductive heat resistance welding to a weld area surrounding the second portion of the crack.

6. The method of claim 1, wherein welding the first portion of the crack using welding other than conductive heat resistance welding comprises using non-air environment about the first portion of the crack.

7. The method of claim 1, wherein welding the first portion of the crack using welding other than conductive heat resistance welding comprises using arc welding.

8. The method of claim 7, wherein using arc welding comprises using gas tungsten arc welding.

9. The method of claim 1, further comprising removing the component from a gas turbine engine prior to performing the welding steps.

10. The method of claim 1, wherein the component is fabricated from aluminum.

11. The method of claim 1, further comprising installing the component, after repair, in a gas turbine engine.

12. The method of claim 1, further comprising, after using the welding other than conductive heat resistance welding, blending any excess material associated with the welding prior to performing the conductive heat resistance welding.

13. A repair method involving conductive heat resistance welding comprising:
   repairing a crack of a gas turbine engine component using a conductive heat resistance welding technique and a welding technique other than conductive heat resistance welding wherein, in repairing the crack, the welding technique other than conductive heat resistance welding is performed prior to the conductive heat resistance welding.

14. The method of claim 13, further comprising cleaning the component after the conductive heat resistance welding.

15. The method of claim 13, wherein using the conductive heat resistance welding technique comprises:
   positioning a metal plug within a portion of the crack;

positioning a conductive plate adjacent to the second portion of the crack; and using the plate to melt the metal plug such that at least a portion of the crack is built up using material provided by the metal plug.

16. The method of claim 13, further comprising performing stress relief on the component after the welding.

* * * * *